United States Patent
Tanavde et al.

(10) Patent No.: US 8,258,680 B2
(45) Date of Patent: Sep. 4, 2012

(54) KEY BAR COMPRESSION APPARATUS

(75) Inventors: Anand S. Tanavde, Schenectady, NY (US); Gregg T. Blackburn, Schenectady, NY (US); David R. Yamarthi, Bangalore (IN)

(73) Assignee: General Electric Company, Schenectady, NY (US)

( * ) Notice: Subject to any disclaimer, the term of this patent is extended or adjusted under 35 U.S.C. 154(b) by 303 days.

(21) Appl. No.: 12/614,957

(22) Filed: Nov. 9, 2009

(65) Prior Publication Data
US 2011/0109187 A1 May 12, 2011

(51) Int. Cl.
*H02K 1/06* (2006.01)
*H02K 1/18* (2006.01)

(52) U.S. Cl. ............... 310/431; 310/179; 310/216.008; 310/216.129; 310/216.135; 310/214; 254/199

(58) Field of Classification Search .............. 310/179, 310/214, 216.008, 216.129, 216.135, 431–433; 254/199; *H02K 1/06, 1/18*
See application file for complete search history.

(56) References Cited

U.S. PATENT DOCUMENTS

| | | | |
|---|---|---|---|
| 4,051,399 A * | 9/1977 | Stanwick et al. | 310/51 |
| 4,725,048 A * | 2/1988 | Jarret et al. | 267/140.4 |
| 4,882,514 A * | 11/1989 | Brynsvold et al. | 310/208 |
| 5,207,114 A * | 5/1993 | Salisbury et al. | 74/479.01 |
| 5,300,845 A * | 4/1994 | Fanning et al. | 310/216.061 |
| 5,525,852 A * | 6/1996 | Fanning et al. | 310/216.061 |
| 6,548,928 B2 | 4/2003 | Walko et al. | |
| 6,597,081 B2 | 7/2003 | Dawson et al. | |
| 6,684,754 B2 * | 2/2004 | Comer | 91/534 |
| 2011/0109187 A1 * | 5/2011 | Tanavde et al. | 310/214 |

FOREIGN PATENT DOCUMENTS

| | | |
|---|---|---|
| GB | 1163037 A | 9/1969 |
| GB | 2470816 A | 12/2010 |

OTHER PUBLICATIONS

Great Britain Search Report issued in connection with corresponding GB Application No. GB1018517.1, Mar. 3, 2011.

* cited by examiner

*Primary Examiner* — John K Kim
(74) *Attorney, Agent, or Firm* — Hoffman Warnick LLC; Ernest G. Cusick (57) ABSTRACT

Solutions for reducing key bar rattle in dynamoelectric machines are disclosed. In one embodiment an apparatus includes: a plurality of key bars operably coupling a stator core to a stator wrapper in which the stator core is at least partially contained; a cable surrounding the plurality of key bars; and at least one anchor device connecting a portion of the cable to the stator wrapper to produce a compressive load on at least one of the plurality of key bars by tightening the cable around the plurality of key bars.

17 Claims, 7 Drawing Sheets

KEY BAR COMPRESSION APPARATUS

BACKGROUND OF THE INVENTION

The subject matter disclosed herein relates to a key bar compression apparatus. Specifically, the subject matter disclosed herein relates to a key bar compression apparatus for reducing key bar vibration and associated noise in dynamoelectric machines.

A stator of a dynamoelectric machine, such as an electric power generator, generally includes a stator core and a stator frame. The stator core typically has a cylindrical shape and includes a stack of insulated steel laminations. Each lamination is a segment of a full circle that has slots on its inner diameter to accommodate a stator winding and dovetail slots on its outer diameter.

The stator frame has plurality of key bars connected thereto, each key bar having a dovetail to provide structural support for the stator core. During assembly of the stator core, each lamination is installed into the stator frame by engaging a dovetail slot of the lamination onto a corresponding key bar dovetail. Sufficient clearance is provided between the key bar dovetails and the faces of the lamination to allow for easy assembly of the stator core, while taking into consideration the location and dimensional tolerances of the key bar and laminations. The clearance between the three faces of the key bar dovetail and the opposing faces of the corresponding lamination dovetail slots varies randomly due to the random location of the key bar dovetail within its location tolerance along the length of the key bar. Due to this variable clearance, the actual contact locations between the key bar dovetail and the corresponding lamination (and hence the contact locations between the stator frame and the stator core) is randomly distributed.

BRIEF DESCRIPTION OF THE INVENTION

Solutions for reducing key bar rattle in dynamoelectric machines are disclosed. In one embodiment an apparatus includes: an apparatus comprising: a plurality of key bars operably coupling a stator core to a stator wrapper in which the stator core is at least partially contained; a cable surrounding the plurality of key bars; and at least one anchor device connecting a portion of the cable to the stator wrapper to produce a compressive load on at least one of the plurality of key bars by tightening the cable around the plurality of key bars.

A first aspect of the invention provides an apparatus comprising: a plurality of key bars operably coupling a stator core to a stator wrapper in which the stator core is at least partially contained; a cable surrounding the plurality of key bars; and at least one anchor device connecting a portion of the cable to the stator wrapper to produce a compressive load on at least one of the plurality of key bars by tightening the cable around the plurality of key bars.

A second aspect of the invention provides a dynamoelectric apparatus comprising: a rotor; and a stator substantially surrounding the rotor, the stator including: a plurality of key bars operably coupling a stator core to a stator wrapper in which the stator core is at least partially contained; a cable surrounding the plurality of key bars; and at least one anchor device connecting a portion of the cable to the stator wrapper to produce a compressive load on at least one of the plurality of key bars by tightening the cable around the plurality of key bars.

A third aspect of the invention provides a power generation system comprising: a turbine; a rotor coupled to the turbine; and a stator substantially surrounding the rotor, the stator including: a plurality of key bars operably coupling a stator core to a stator wrapper in which the stator core is at least partially contained; a cable surrounding the plurality of key bars; and at least one anchor device connecting a portion of the cable to the stator wrapper to produce a compressive load on at least one of the plurality of key bars by tightening the cable around the plurality of key bars.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
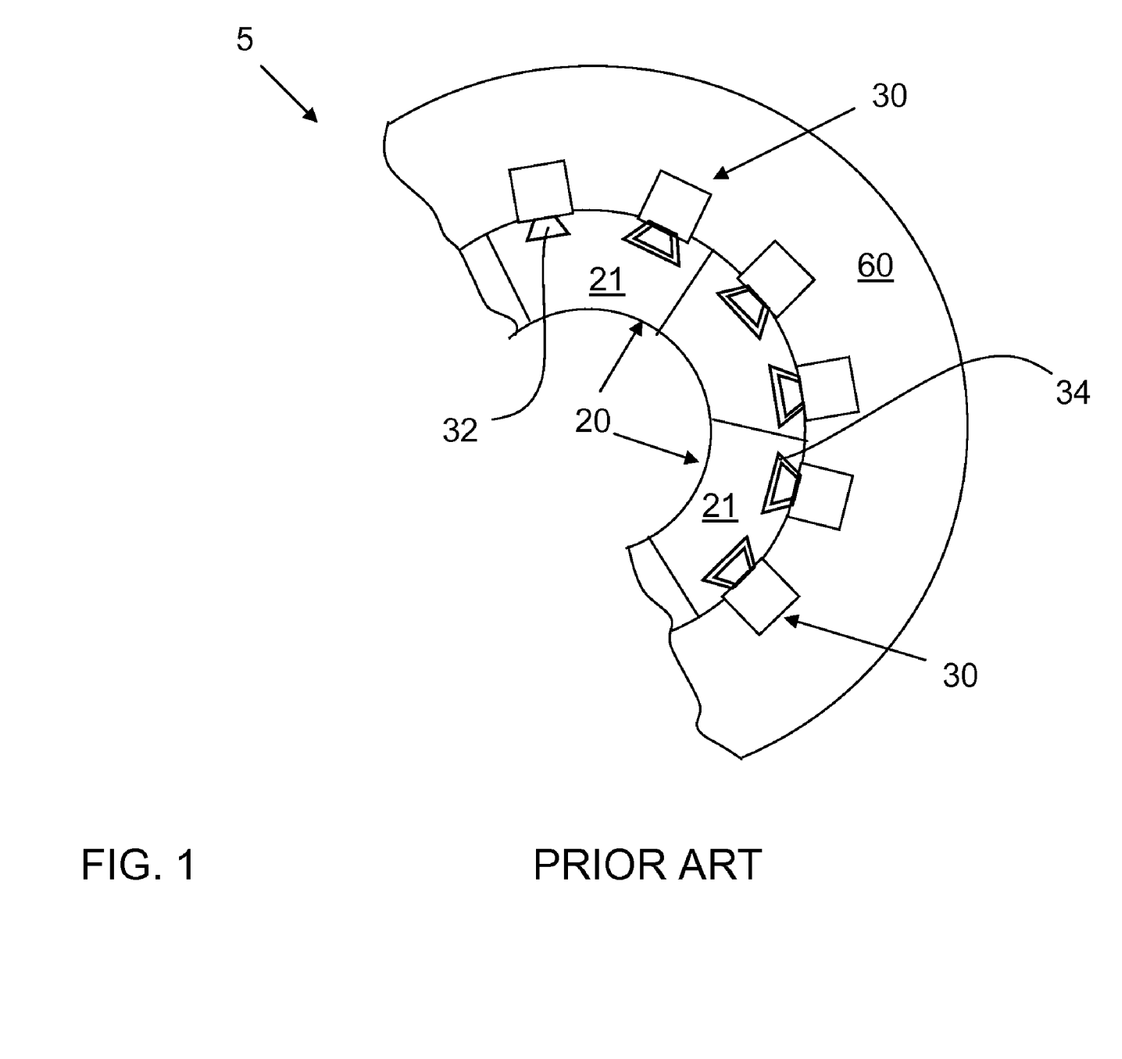
FIG. 1 shows a partial cross-sectional view of portions of a prior art stator.

As indicated above, aspects of the invention provide for reducing key bar vibration and related machine noise in dynamoelectric machines. Turning to the drawings, FIG. 1 shows a partial cross-sectional view of a prior art stator 5 of a dynamoelectric machine, such as a generator or motor. Stator 5 is shown including a stator core 20 housing a plurality of key bar slots 34 and a stator wrapper 60 housing a plurality of key bars 30, the key bars 30 engaging the key bar slots 34. As shown, stator core 20 may be formed of a plurality of stacked laminations 21, however, stator core 20 will be referred to herein as one continuous core unit for clarity. Key bars 30 may have dovetailed portions 32 complimenting the dovetail-shaped key bar slots 34. In order to facilitate assembly of stator 5, clearance must be provided between key bar slots 34 and dovetailed portions 32 of key bars 30. A large clearance (e.g., 0.010-0.020 inches) between key bar slots 34 and dovetailed portions 32 may make assembly of stator 5 relatively easy. However, during operation of the dynamoelectric machine (not shown), this clearance may contribute to a condition known as "key bar rattle." Key bar rattle will be explained in greater detail with respect FIGS. 2-5

As used herein, the example of an electric generator will be used to describe aspects of the invention and the prior art. It is understood that an electric generator is merely one example of a dynamoelectric machine to which the teachings of the invention may be applied. For example, the teachings of the invention may be similarly applied to other machines such as electric motors. In any case, use of the term "generator" or "electric generator" does not limit the teachings of the invention to such specific types of dynamoelectric machine.

Figure 2:
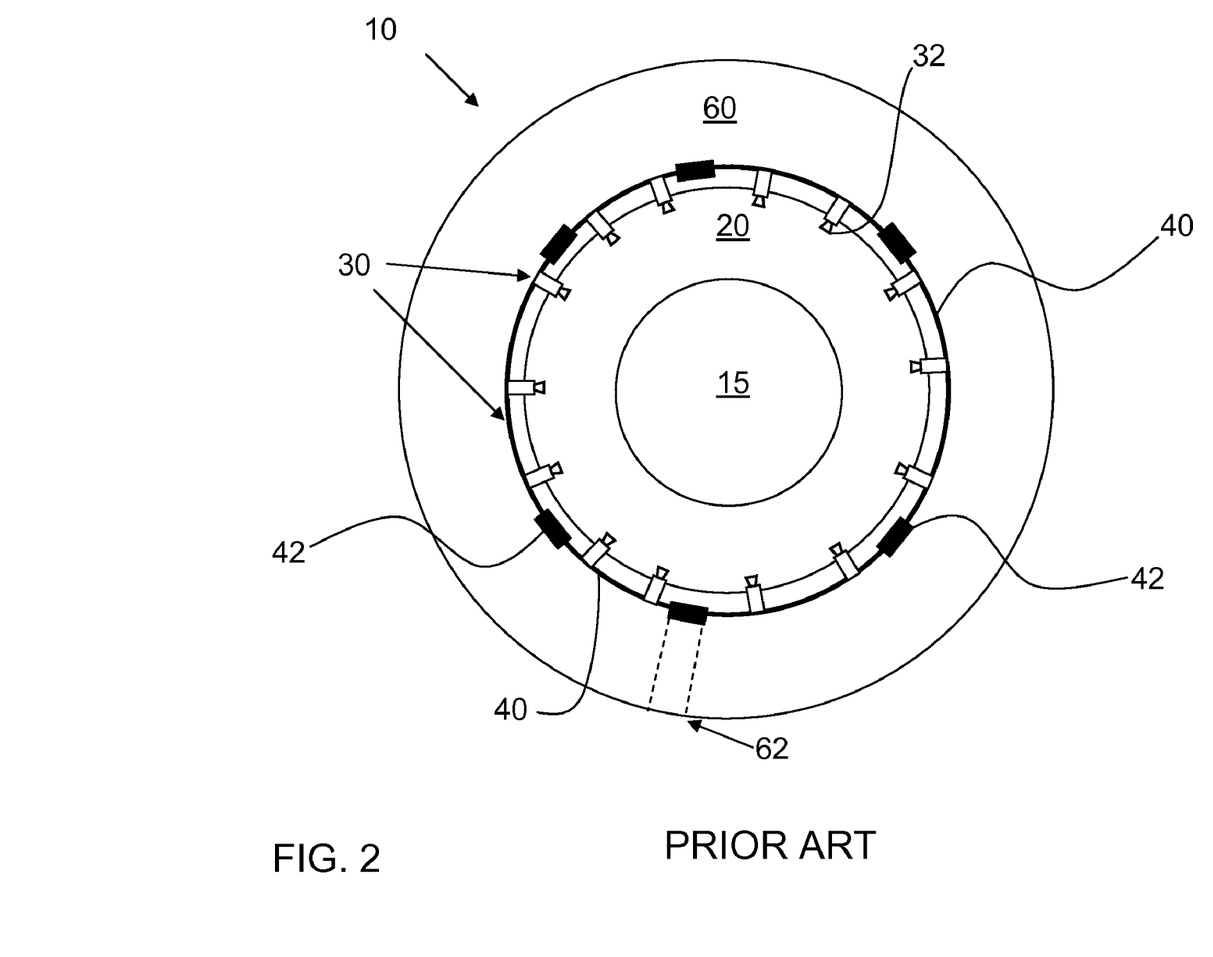
FIG. 2 shows a side view of a key bar compression mechanism according to the prior art.

Turning to FIG. 2, a prior art mechanism for reducing key bar rattle in dynamoelectric machines is shown. FIG. 2 shows a dynamoelectric apparatus 10 including a rotor 15, a stator core 20, a plurality of key bars 30 operably attached to stator core 20, a plurality of compression band segments 40 in contact with the plurality of key bars 30, and a stator wrapper 60 attached to and surrounding the plurality of key bars 30. It is understood that key bars 30 may provide points of connection between stator core 20 and stator wrapper 60 similarly as shown and described with reference to FIG. 1. Details of key bars 30, dovetailed portions 32, and dovetailed key bar slots 34 have been omitted for clarity (FIG. 1). As shown, plurality of compression band segments 40 may be attached to one another via a plurality of compression band joints 42. As is known in the art, compression band joints 42 are typically formed of a metal, and allow for attachment of the plurality of compression band segments 40 into one continuous ring surrounding key bars 30. Compression band joints 42 typically include a mechanism for tightening or loosening the connection between compression band segments 40. Compression band segments 40 may be formed of a metal such as steel. In order to tighten or loosen the ring formed by compression band segments 40 around key bars 30, an operator must open stator wrapper 60 at opening 62, and manually tighten the connection formed by compression band joints 42. Accessing compression band joints 42 using this method requires a shut-down of generator apparatus 10, and may also require degassing dynamoelectric apparatus 10. As is known in the art, hydrogen is often used as a coolant in dynamoelectric machines (e.g., generators) due to, among other things, its heat transfer characteristics. However, when servicing or shutting down a generator, hydrogen is frequently purged from the system to allow for safe access by a human operator. Shutting down and/or degassing a generator may be inconvenient and costly. Further, in order to uniformly tighten the ring of compression band segments 40, the operator must access multiple compression band joints 42 via multiple openings 62. This further lengthens the repair time, and reduces the time that the dynamoelectric apparatus 10 is generating electricity.

Figure 3:
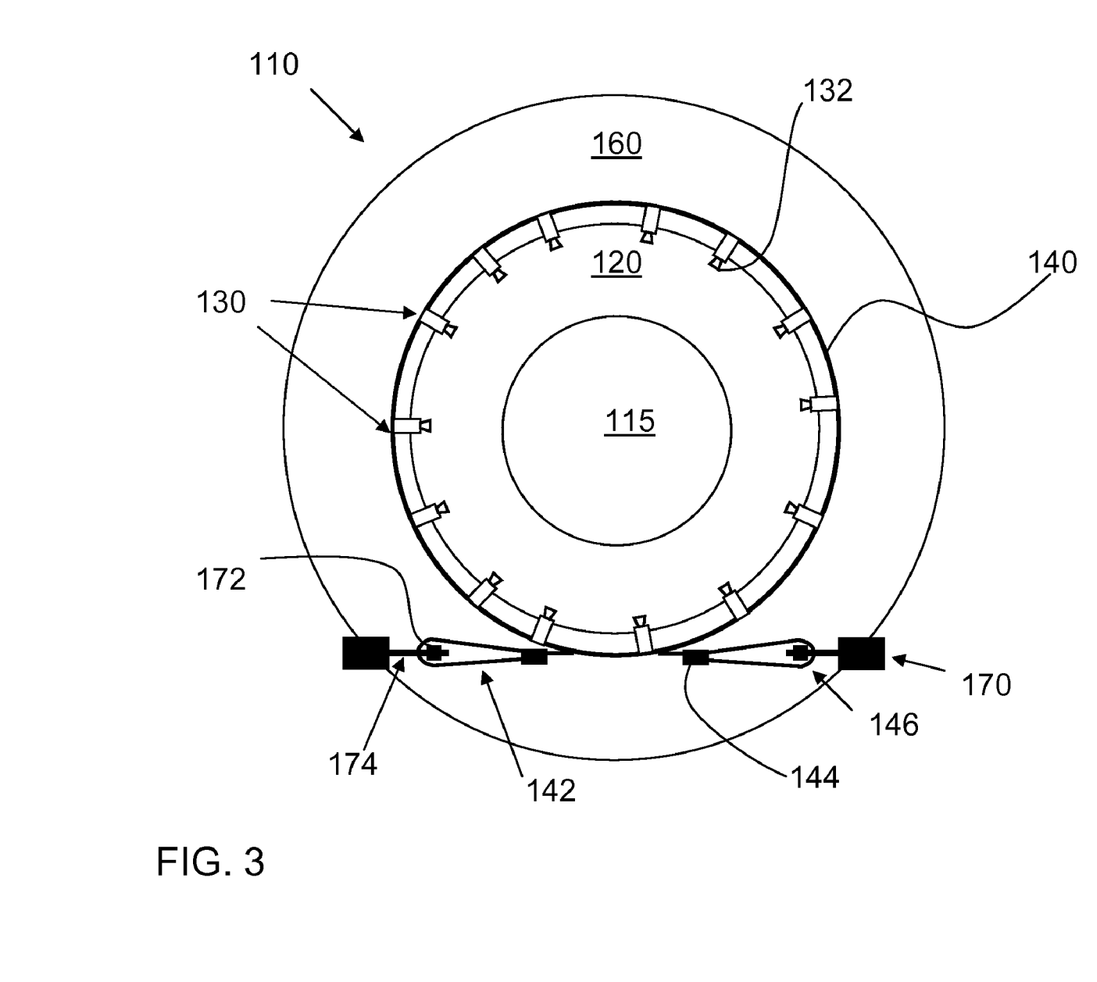
FIG. 3 shows a side view of a key bar compression mechanism according to one embodiment of the invention.

Turning to FIG. 3, a dynamoelectric apparatus 110 according to one embodiment of the invention is shown. Dynamoelectric apparatus 110 may include a dynamoelectric rotor 115, a dynamoelectric stator wrapper 160, a dynamoelectric stator core 120 and a plurality of key bars 130. Dynamoelectric stator core 120 may be at least partially contained within dynamoelectric stator wrapper 160. Plurality of key bars 130 may be operably attached to dynamoelectric stator core 120 and dynamoelectric stator wrapper 160 via conventional means. For example, key bars may be welded or otherwise attached to dynamoelectric stator wrapper 160, and may be attached to stator core 120 via complementary dovetail connections (FIG. 1). As is known in the art, stator core 120 may have a plurality of dovetail slots (FIG. 1) for accommodating attachment to plurality of key bars 130, each key bar 130 having a dovetailed portion 132. The dovetail slots may be large enough to accommodate dovetailed portions of key bars 130 and provide sufficient clearance to allow for effective attachment and separation of key bars 130 and stator core 120. This clearance may range from approximately 0.010 to 0.020 inches. During operation of dynamoelectric apparatus 110, clearance between each dovetailed portion 132 of key bar 130 and each dovetail slot of stator core 120 may allow for movement of stator core 120. This movement may be caused, for example, by the expansion and contraction of stator core 120 due to magnetic flux forces. In any case, this movement may cause undesirable noises and damage to dynamoelectric apparatus 110. This noise is known in the art as "rattle" or "key bar rattle."

Dynamoelectric apparatus 110 may further include a cable 140 surrounding plurality of key bars 130. As shown in FIG. 3, a portion 146 of cable 140 may be connected to a wall of stator wrapper 160 via an anchor device 170. When tightened, cable 140 may be configured to provide a compressive load on at least one of the plurality of key bars 130. Anchor device 170 may further be configured to tighten cable 140, thereby creating tension in cable 140 and providing the compressive load on at least one of the plurality of key bars 130. Different embodiments of anchor device 170 and methods of tightening cable 140 are discussed further herein. The compressive load provided by cable 140 may reduce the clearance between key bar dovetails 132 and stator dovetail slots (not shown) of core 120, and may reduce key bar rattle during operation of dynamoelectric apparatus 110.

Figure 6:
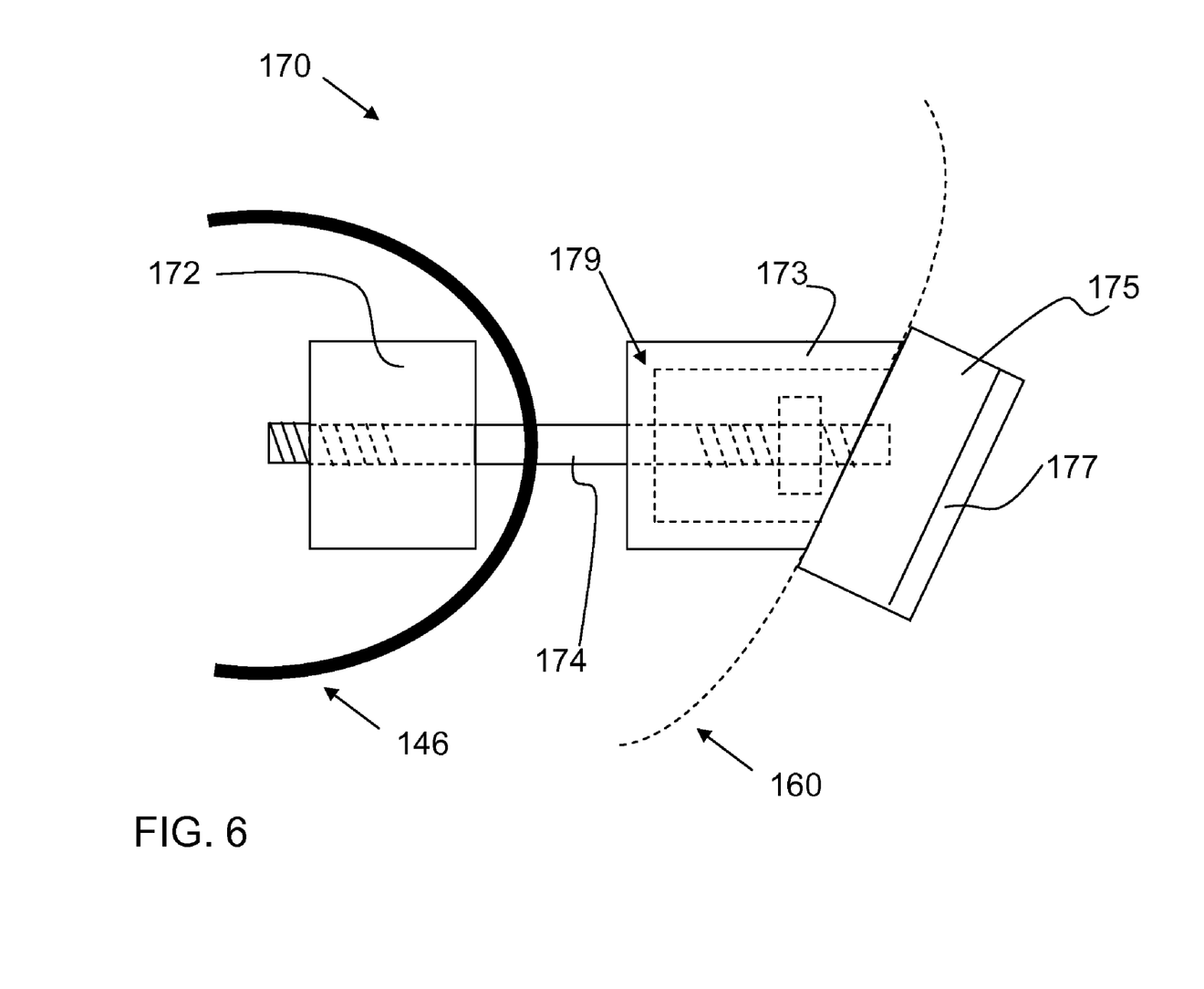
FIG. 6 shows a close-up side view of a portion of a key bar compression mechanism according to one embodiment of the invention.

In one embodiment, portion 146 of cable 140 may include a loop 142 configured to attach portion 146 of cable 140 to anchor device 170. Loop 142 may be formed, for example, by attaching a first portion of cable 146 to a second portion of cable 146 using a coupler 144. Coupler 144 may be any conventional coupling device, such as a clasp, clamp, etc. Anchor device 170 may be any device capable of anchoring portion 146 of cable 140 to the wall of stator wrapper 160. For example, in one embodiment, anchor device 170 may include an anchor block 172 and at least one bolt 174. Anchor block 172, as shown and described with reference to FIG. 6, may be any piece of material capable of holding first portion of cable 146. For example, anchor block 172 may be a dumbbell-shaped block made from a metal, composite, etc. In this embodiment, first portion of cable 146 (e.g., loop 142) may attach to the narrow portion of the dumbbell-shaped anchor block 172. In this embodiment, anchor block 172 may be configured to pull loop 142 toward a wall of stator wrapper 160 by tightening of the at least one bolt 174. At least one bolt 174 may have a first end engaging (e.g., threaded through) anchor block 172, and a second end engaging (e.g., threaded through) access block 173 (FIG. 6). Bolt 174 may be tightened from its second end (e.g., at access block 173), which may be accessible from a point external to the wall of stator wrapper 160.

In another embodiment, anchor device 170 may include an electric motor (not shown), configured to tighten cable 140 using, e.g., electro-mechanical movement of a hook, loop, anchor block, etc. This motor may be coupled to a hook or other engaging device, and in response to an electrical signal, may pull portion 146 of cable toward a wall of stator wrapper 160. In this embodiment, the motor may be controlled by a wireless or hard-wired controller or a computerized device such as a specific use computer. In any case, anchor device 170 may provide for tightening of cable 160, causing cable 140 to constrict plurality of key bars 130, thereby reducing the clearance between key bar dovetails 132 and the dovetail slots of stator core 120. As shown in FIG. 3, dynamoelectric apparatus 110 may include at least one anchor device 170, which may allow for tightening of cable 140.

Figure 4:
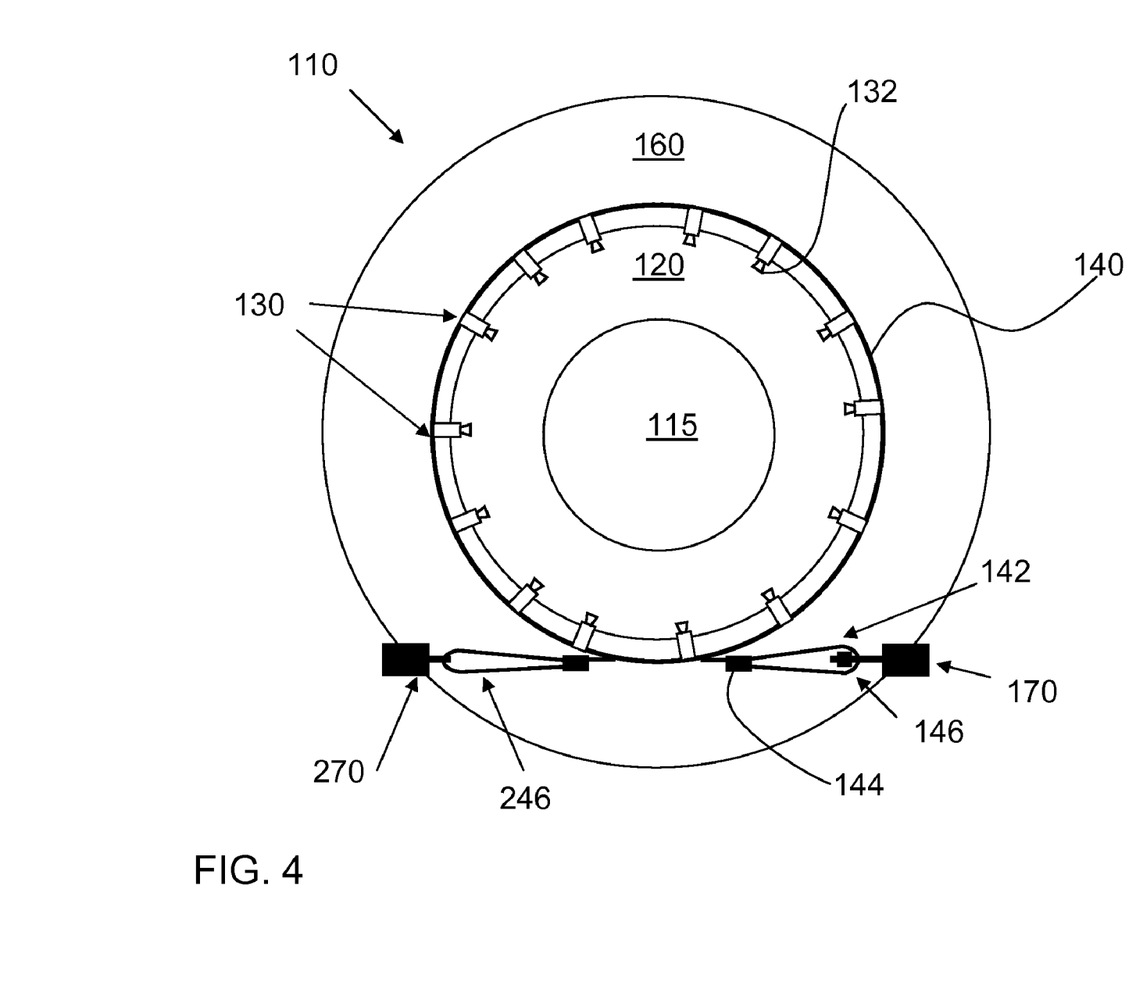
FIG. 4 shows a side view of a key bar compression mechanism according to one embodiment of the invention.

FIG. 4 shows an alternate embodiment of dynamoelectric apparatus 110 of FIG. 3. In this embodiment, only one anchor device 170 is used to tighten cable 140. In this case, a holding device 270 may be used to hold a second portion of cable 246 in place while first portion 146 is tightened via anchor device 170. Holding device 270 may be any device capable of holding second portion of cable 246 in a substantially fixed position with respect to a wall of stator wrapper 160. For example, holding device 270 may be a hook, loop, block, bolt, etc. Second portion of cable 246 may be substantially similar to first portion 146 (e.g., a cable loop), or second portion of cable 246 may be formed of a different shape and/or material. For example, second portion of cable 246 may be reinforced with an additional material coating, and/or may be fastened to holding device 270 via, e.g., a weld. In any case, in this embodiment, second portion of cable 246 may remain in a substantially fixed position with respect to a wall of stator wrapper 160.

Figure 5:
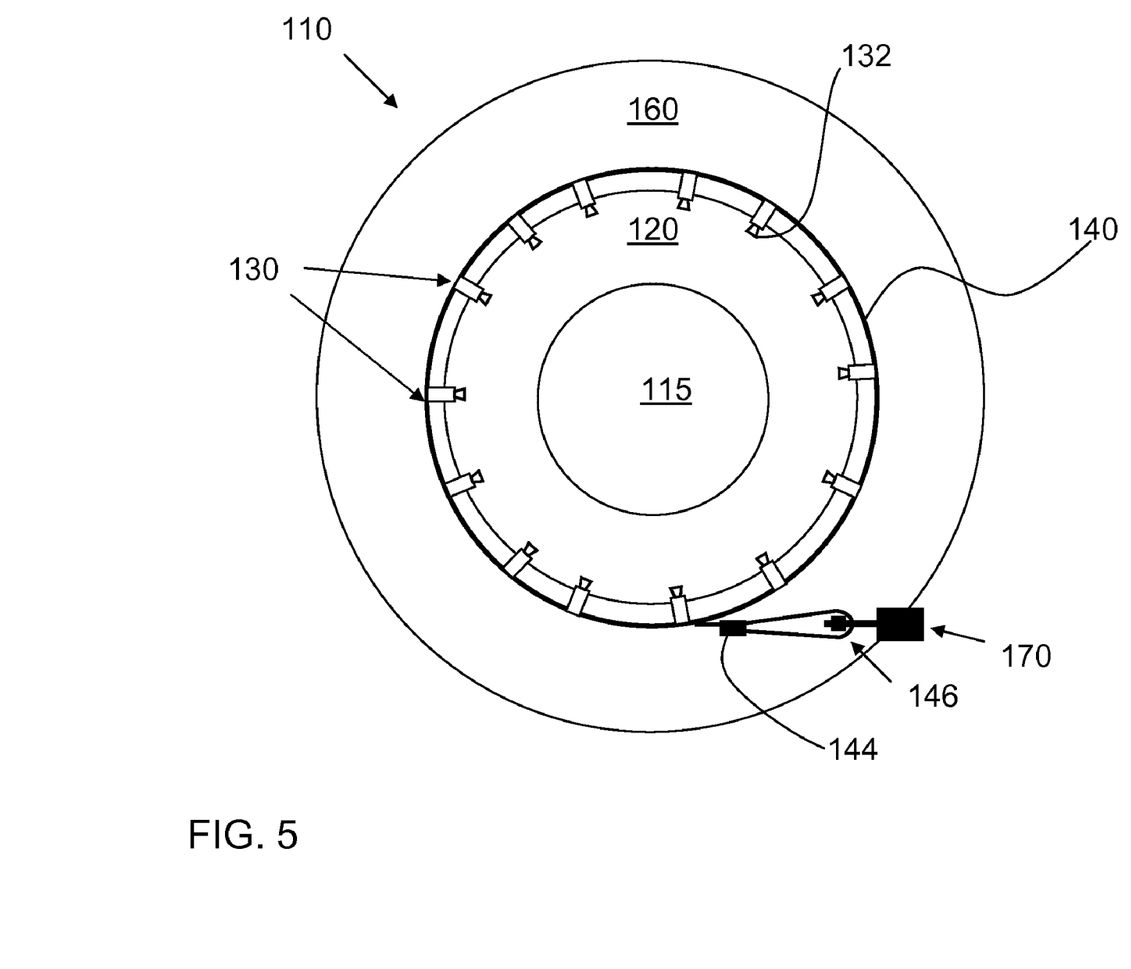
FIG. 5 shows a side view of a key bar compression mechanism according to one embodiment of the invention.

FIG. 5 shows another alternative embodiment of dynamoelectric apparatus 110 of FIG. 3 and FIG. 4. In this embodiment, only one anchor device 170 may be used to secure and tighten first portion 146. In this case, cable 140 may be configured to loop around itself, using, e.g., a loop and coupler (similar to coupler 144), or another mechanism for linking an end of cable 140 to another portion of cable 140. This embodiment may allow for reduced costs in that only one anchor device 170 is attached to stator wrapper 160.

As shown in FIGS. 3-5, anchor device 170 and portion of cable 146 may be attached to one another at a point internal to the wall of stator wrapper 160, while a portion of anchor device 170 is accessible from a point external to the wall. This may allow for, among other things, tightening of cable 140 without the need to open an interior portion of the wrapper wall (distinct from e.g., opening 62 of FIG. 1). Anchor device 170 may further provide a substantially air-tight seal between the point internal to wrapper wall (where portion of cable 146 and anchor device 170 attach) and the point external to the wall (where anchor device 170 may be adjusted). The substantially air-tight seal may be provided, for example, by a gland or other sealing device (FIG. 6). Accessing anchor device 170 from a point external to the wall of stator wrapper 160 may allow for tightening or loosening of cable 140 without the need to degas or shut down dynamoelectric apparatus 110.

Cable 140 may be formed of, for example, a steel cable encased in a composite material sheathing such as, e.g., braided polyester or Kevlar. Cable 140 may also be formed primarily of a composite such as, for example, carbon fiber reinforced composite (CFRP). In any case, cable may provide a compressive force on key bars 130 without substantially altering the physical properties of dynamoelectric apparatus 110. As is known in the art, key bars 130 may provide a connection between stator wrapper 160 and stator core 120. Key bars 130 also serve to partially suspend stator core 120, within dynamoelectric apparatus 110. As such, providing a compressive force on key bars 130 necessarily works to alter the amount of suspension provided by key bars 130 to stator core 120. However, using cable 140, as opposed to (e.g., steel) compression band segments 40 of the prior art (FIG. 1), dynamoelectric apparatus 110 is capable of providing a compressive force on key bars 130 while only minimally impacting the suspension of stator core 120. For example, in one embodiment, cable 140 may modify the suspension compliance of stator core 120 by less than 10-15%. It is understood that while cable 140 may be applied to a pre-designed dynamoelectric apparatus 110, in one embodiment, dynamoelectric apparatus 110 may be designed to compensate for suspension-related effects of cable 140.

FIG. 6 shows a close-up side view of portions of a dynamoelectric apparatus 110 according to one embodiment of the invention. As shown, anchor device 170 may include anchor block 172, bolt 174, an interior access block 173 including a seal 179, and an exterior access block 175 including an access cover 177. In this embodiment, bolt 174 may be tightened from an access point external to the wall of stator wrapper 160, via, e.g., tightening of a nut holding bolt 174. An operator can access bolt 174 from a point external to the wall of stator wrapper 160 by removing access cover 177 of exterior access block 175. Seal 179 may provide a substantially air-tight seal between the point external to the wall of stator wrapper 160 and a point internal to that wall. Interior access block 173 and exterior access block 175 may include any suitable materials, such as metals and/or composites. As shown, exterior access block 175 may be mounted externally on the wall of generator wrapper 160. This may reduce the costs and complexity of accessing bolt 174, as access cover 177 need only be removed from the exterior portion of the wall. Access cover 177 may be bolted, screwed, clamped, snapped closed, etc., over exterior access block 175. In any case, in this embodiment, an operator can modify the tension on cable 140 without the need to degas and/or shut down dynamoelectric apparatus 110.

Figure 7:
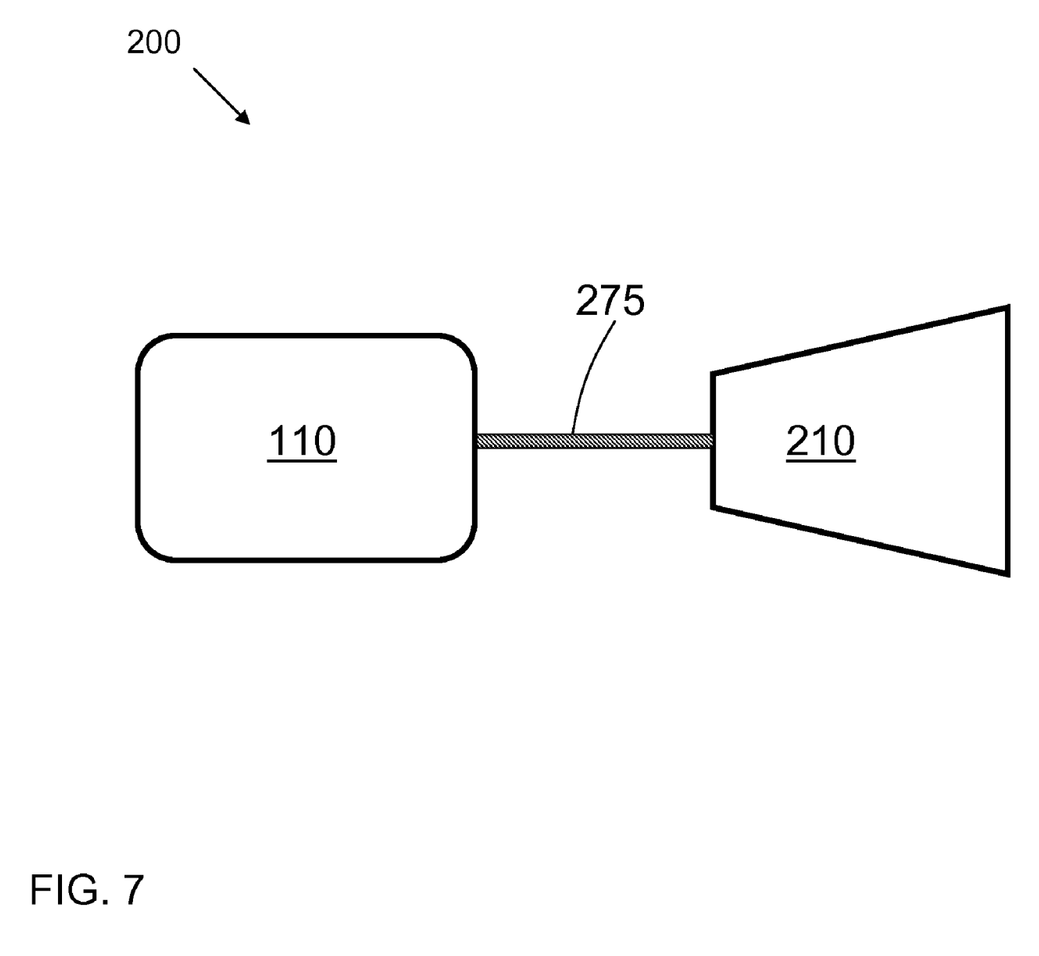
FIG. 7 shows a schematic diagram of a power generation system according to one embodiment of the invention.

Turning to FIG. 7, components included in a power generation system 200 are shown. Power generation system 200 may include a dynamoelectric apparatus 110, a turbine 210 and a shaft 275. Dynamoelectric apparatus 110 may be similar to the dynamoelectric apparatus shown and described with reference to FIG. 2. As shown, dynamoelectric apparatus 110 may be coupled to turbine 210 via shaft 275. Turbine 210 may be any conventional steam turbine or gas turbine. Further, turbine 210 may represent a plurality of turbine systems, such as multiple steam turbine sections including one or more of a high power section, intermediate power section, and low power section. Other components included in conventional turbine systems (e.g., condensers, HRSG sections, etc.) have been omitted for clarity. In any case, turbine 210 may generate rotational motion via the flow of steam or hot gas across turbine blades (not shown). This rotational motion may be transferred to dynamoelectric apparatus 110 via shaft 275, which may in turn transfer that rotational motion to rotor 115 (FIG. 2). Rotation of rotor 115 inside dynamoelectric apparatus 110 may, e.g., generate electricity for use in, e.g., homes, businesses, etc. It is also understood that rotational motion from dynamoelectric apparatus 110 may be transferred to turbine 210 via shaft, for example, during start-up of turbine 210.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An apparatus comprising:
   a plurality of key bars operably coupling a stator core to a stator wrapper in which the stator core is at least partially contained;
   a cable surrounding the plurality of key bars; and
   at least one anchor device connecting a portion of the cable to the stator wrapper to produce a compressive load on at least one of the plurality of key bars by tightening the cable around the plurality of key bars.

2. The apparatus of claim 1, wherein the cable includes a loop configured to attach the portion of the cable to the at least one anchor device.

3. The apparatus of claim 2, wherein the at least one anchor device includes an anchor block and at least one bolt, the anchor block configured to engage the loop by tightening of the at least one bolt.

4. The apparatus of claim 1, wherein the cable includes at least one of: braided polyester, Kevlar, or carbon fiber reinforced composite (CFRP).

5. The apparatus of claim 1, wherein the at least one anchor device and the portion of the cable are attached to a wall of the wrapper, and wherein the at least one anchor device is accessible from a point external to the wall.

6. The apparatus of claim 5, wherein the at least one anchor device provides a substantially air-tight seal between a point internal to the wall and the point external to the wall.

7. A dynamoelectric apparatus comprising:
   a rotor; and
   a stator substantially surrounding the rotor, the stator including:
   a plurality of key bars operably coupling a stator core to a stator wrapper in which the stator core is at least partially contained;
   a cable surrounding the plurality of key bars; and
   at least one anchor device connecting a portion of the cable to the stator wrapper to produce a compressive load on at least one of the plurality of key bars by tightening the cable around the plurality of key bars.

8. The dynamoelectric apparatus of claim 7, wherein the cable includes a loop configured to attach the portion of the cable to the at least one anchor device.

9. The dynamoelectric apparatus of claim 8, wherein the at least one anchor device includes an anchor block and at least one bolt, the anchor block configured to engage the loop by tightening of the at least one bolt.

10. The dynamoelectric apparatus of claim 7, wherein the cable includes at least one of: braided polyester, Kevlar, or carbon fiber reinforced composite (CFRP).

11. The dynamoelectric apparatus of claim 7, wherein the at least one anchor device and the portion of the cable are attached to a wall of the wrapper, and wherein the at least one anchor device is accessible from a point external to the wall.

12. The dynamoelectric apparatus of claim 11, wherein the at least one anchor device provides a substantially air-tight seal between a point internal to the wall and the point external to the wall.

13. A power generation system comprising:
   a turbine;
   a rotor coupled to the turbine; and
   a stator substantially surrounding the rotor, the stator including:
   a plurality of key bars operably coupling a stator core to a stator wrapper in which the stator core is at least partially contained;
   a cable surrounding the plurality of key bars; and
   at least one anchor device connecting a portion of the cable to the stator wrapper to produce a compressive load on at least one of the plurality of key bars by tightening the cable around the plurality of key bars.

14. The power generation system of claim 13, further comprising a coupler for forming a loop in the cable, the loop configured to attach the portion of the cable to the at least one anchor device.

15. The power generation system of claim 14, wherein the at least one anchor device includes an anchor block and at least one bolt, the anchor block configured to engage the loop by tightening of the at least one bolt.

16. The power generation system of claim 13, wherein the at least one anchor device and the portion of the cable are attached to a wall of the wrapper, and wherein the anchor device is accessible from a point external to the wall.

17. The power generation system of claim 16, wherein the at least one anchor device provides a substantially air-tight seal between a point internal to the wall and the point external to the wall.

* * * * *